(12) United States Patent
Makinen et al.

(10) Patent No.: US 10,852,779 B2
(45) Date of Patent: *Dec. 1, 2020

(54) DUAL SCREEN ELECTRONIC DEVICES WITH STOWABLE KEYBOARDS

(71) Applicant: Intel Corporation, Santa Clara, CA (US)

(72) Inventors: Mikko Makinen, San Jose, CA (US); Gustavo Fricke, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/697,980

(22) Filed: Nov. 27, 2019

(65) Prior Publication Data

US 2020/0097052 A1    Mar. 26, 2020

Related U.S. Application Data

(63) Continuation of application No. 16/023,853, filed on Jun. 29, 2018, now Pat. No. 10,534,406.

(51) Int. Cl.
    *G06F 1/16* (2006.01)
(52) U.S. Cl.
    CPC .......... *G06F 1/1681* (2013.01); *G06F 1/1616* (2013.01); *G06F 1/1618* (2013.01); *G06F 1/1624* (2013.01); *G06F 1/1641* (2013.01); *G06F 1/1647* (2013.01); *G06F 1/1669* (2013.01); *G06F 1/1677* (2013.01)

(58) Field of Classification Search
    CPC .... G06F 1/1681; G06F 1/1616; G06F 1/1618; G06F 1/1641; G06F 1/1692; G06F 1/1647; G06F 1/1669; G06F 1/1677
    See application file for complete search history.

(56) References Cited

U.S. PATENT DOCUMENTS

| | | | | |
|---|---|---|---|---|
| 6,223,393 B1* | 5/2001 | Knopf | ................... | G06F 1/1618 16/366 |
| 2015/0077917 A1* | 3/2015 | Song | ..................... | G06F 1/1652 361/679.27 |
| 2015/0370287 A1* | 12/2015 | Ko | ......................... | G06F 1/1681 361/749 |
| 2016/0132075 A1* | 5/2016 | Tazbaz | ................ | H04M 1/0216 361/679.27 |

(Continued)

OTHER PUBLICATIONS

Copper Harbor Hing, 1 page.

(Continued)

*Primary Examiner* — Nidhi Thaker
(74) *Attorney, Agent, or Firm* — Hanley, Fligth and Zimmerman, LLC

(57) ABSTRACT

Apparatus, systems, articles of manufacture, and methods have been disclosed that include example hinges that enable a physical keyboard to be stowed between halves of a closed electronic device with dual screens. An example device includes a first screen, a second screen, a first hinge pair, and a second hinge pair. The first hinge pair and the second hinge pair enable 360 degrees of rotation between the first screen and the second screen. The device also includes a physical keyboard that is couplable to a plurality of positions on at least one of the first screen or the second screen.

21 Claims, 14 Drawing Sheets

(56) References Cited

U.S. PATENT DOCUMENTS

| | | | | |
|---|---|---|---|---|
| 2016/0139634 A1* | 5/2016 | Cho | ................... | G06F 1/1652 |
| | | | | 361/679.27 |
| 2016/0187934 A1* | 6/2016 | Lee | ................... | G06F 1/1618 |
| | | | | 361/679.56 |
| 2016/0187935 A1* | 6/2016 | Tazbaz | ............... | G06F 1/1616 |
| | | | | 361/679.03 |
| 2016/0334836 A1* | 11/2016 | Hong | ................. | G06F 1/1686 |
| 2017/0208699 A1* | 7/2017 | McDermid | ........ | G06F 1/1616 |
| 2018/0210508 A1* | 7/2018 | Aurongzeb | ........ | G06F 1/1669 |
| 2019/0033925 A1* | 1/2019 | Hong | ................. | G06F 1/1681 |
| 2019/0041919 A1 | 2/2019 | Makinen et al. | | |

OTHER PUBLICATIONS

Lenovo, "Yoga 3 Pro hinge", 1 page.
United States Patent and Trademark Office, "Notice of Allowance," issued in connection with U.S. Appl. No. 16/023,853, dated Oct. 11, 2019, 21 pages.
United States Patent and Trademark Office, "Non-Final Office action," issued in connection with U.S. Appl. No. 16/023,853, dated May 15, 2019, 31 pages.

\* cited by examiner

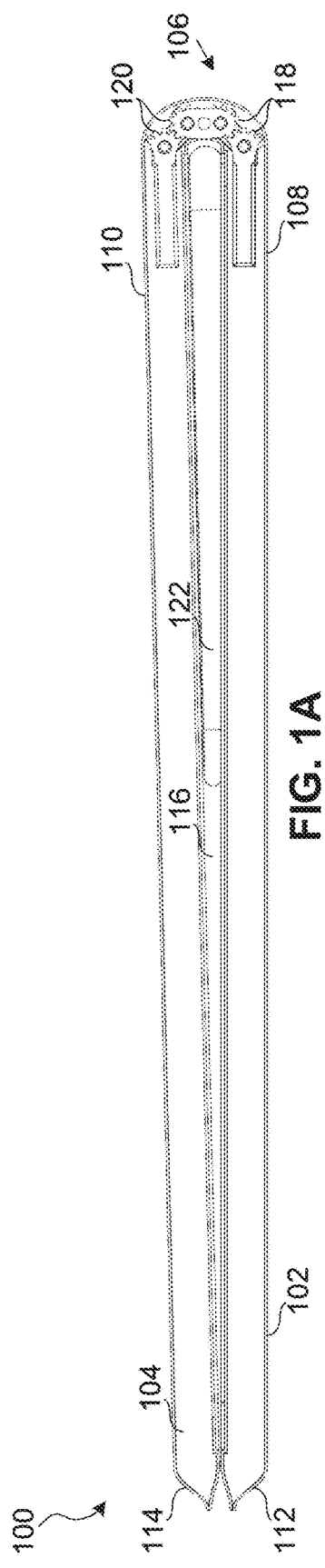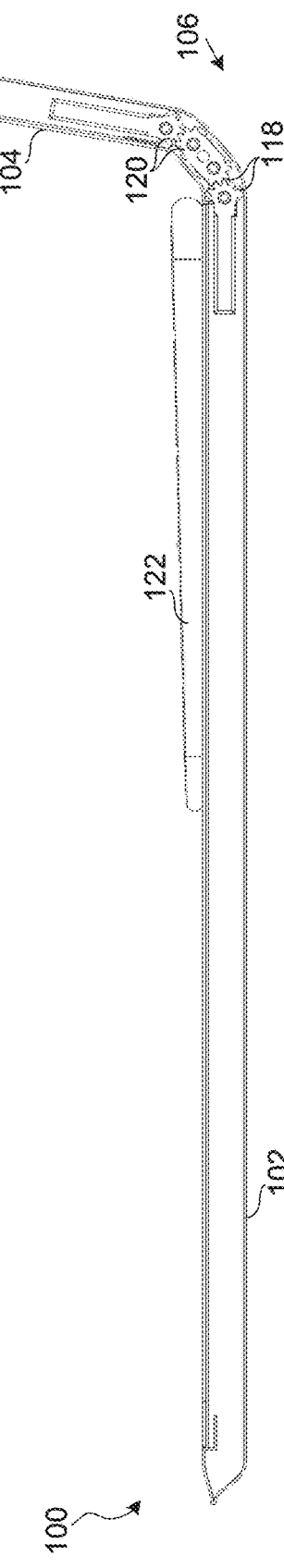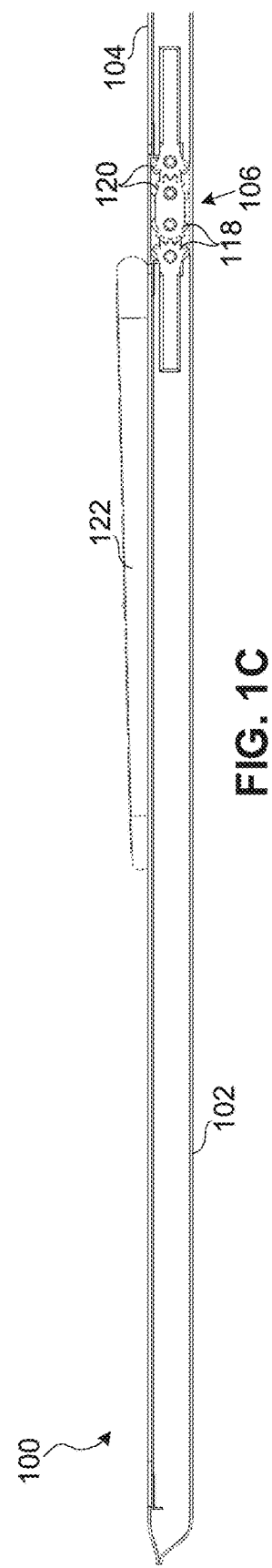

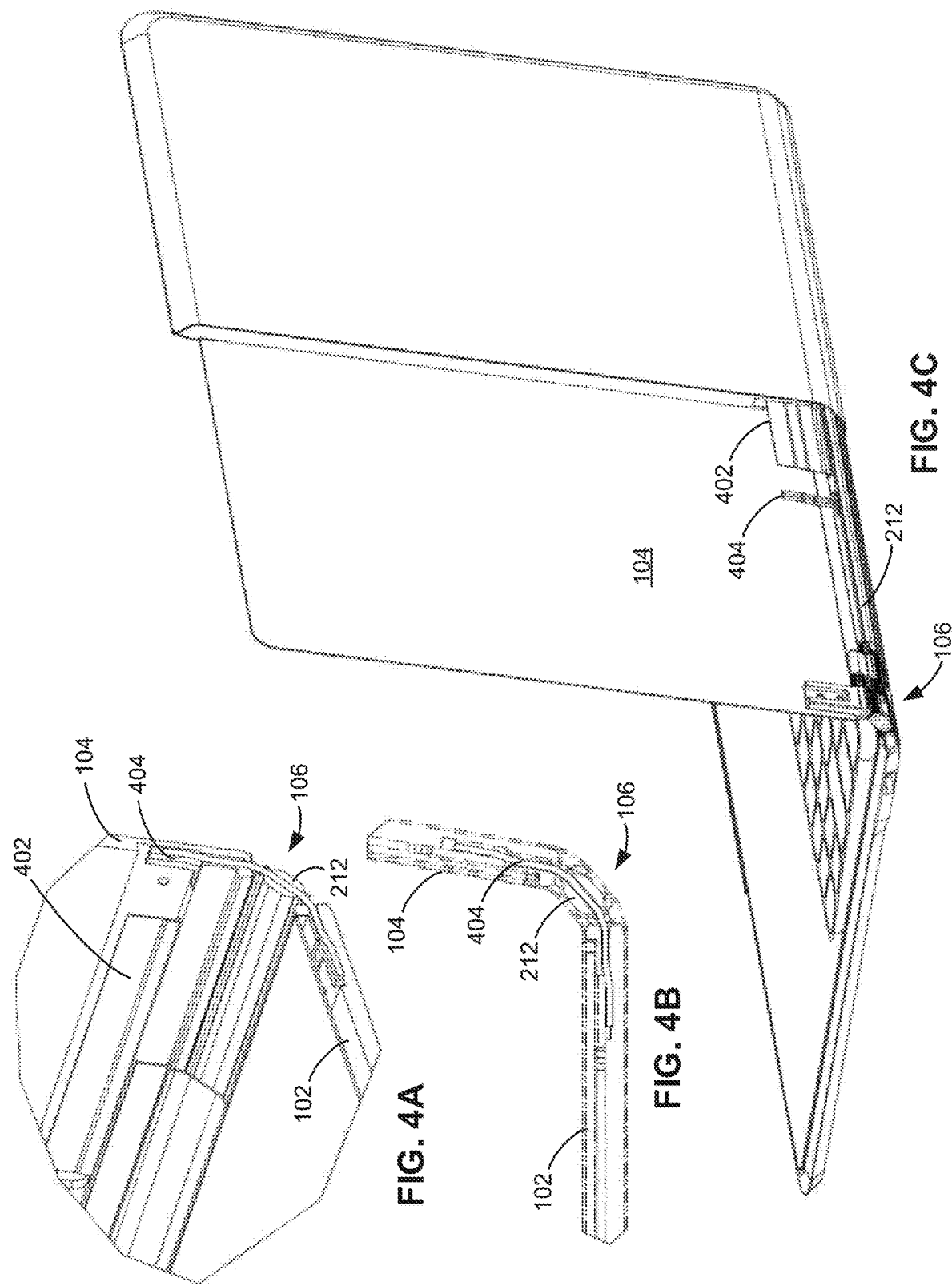

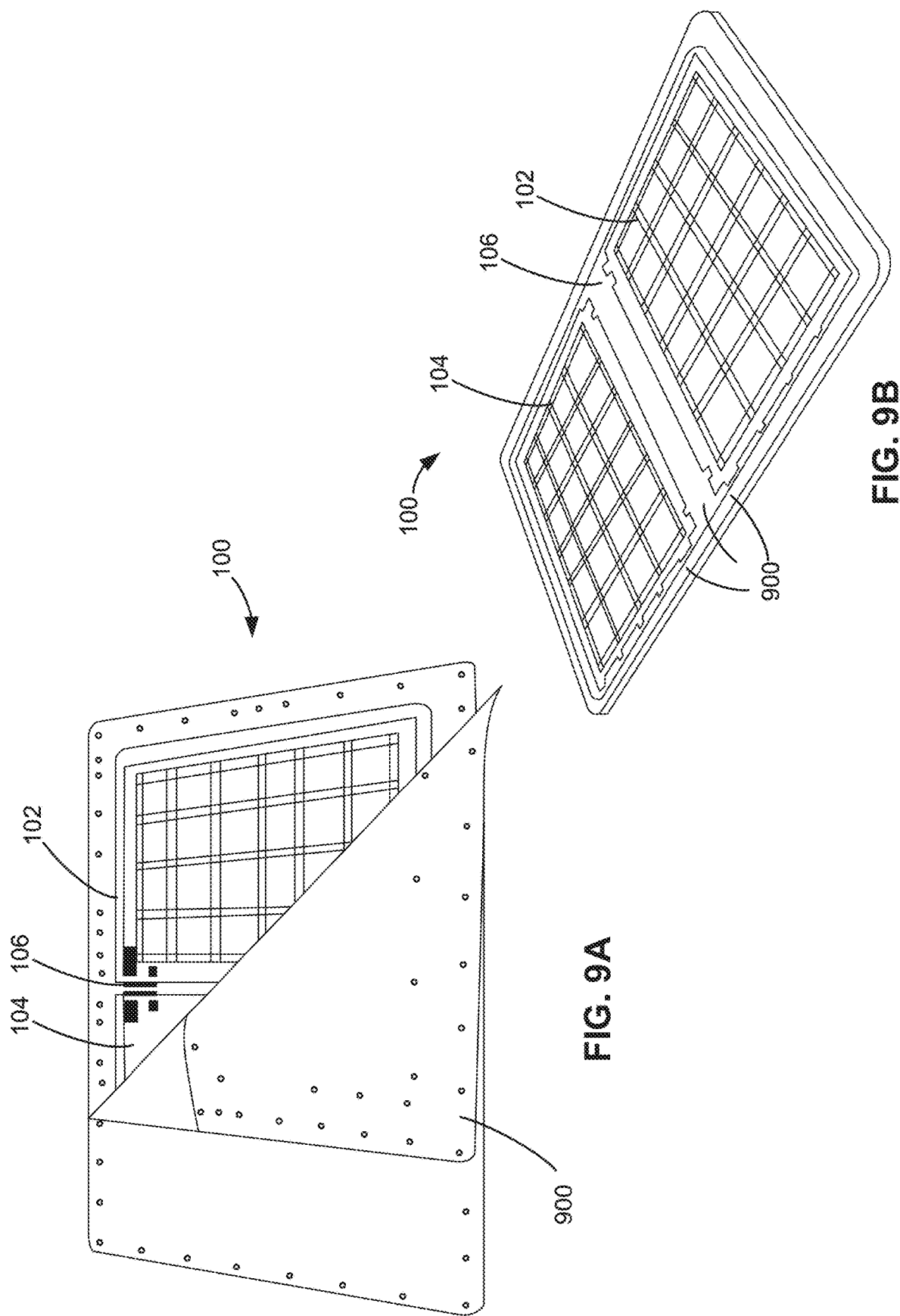

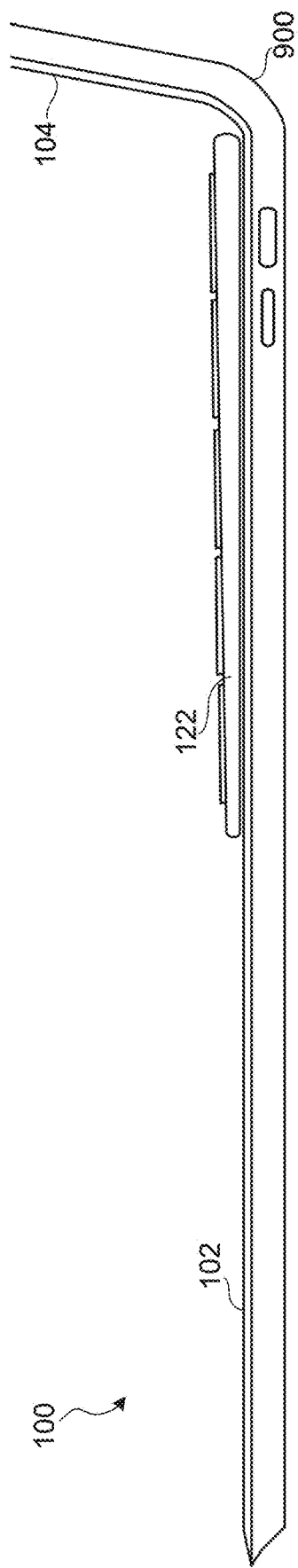
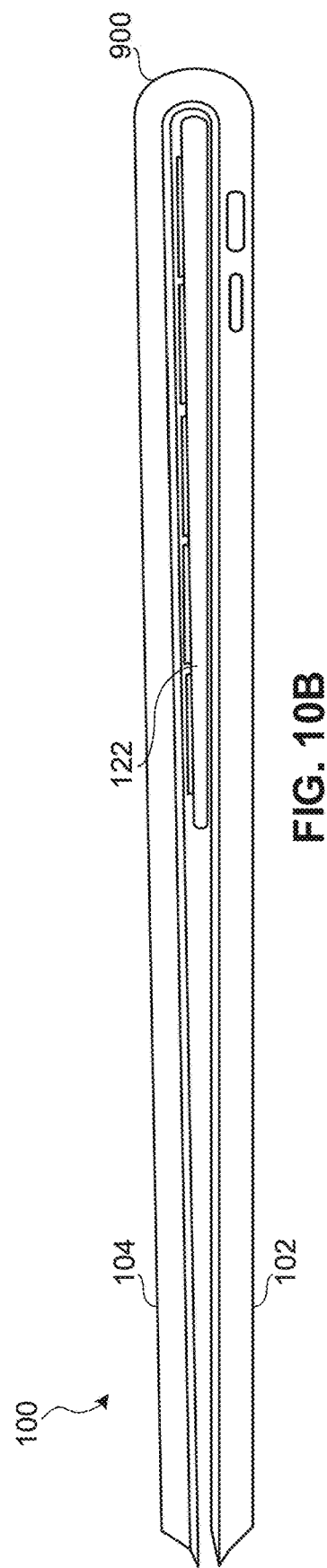
FIG. 10A
FIG. 10B

DUAL SCREEN ELECTRONIC DEVICES WITH STOWABLE KEYBOARDS

RELATED APPLICATION

This patent arises as a continuation of U.S. patent application Ser. No. 16/023,853, which was filed on Jun. 29, 2018. Priority is claimed to U.S. patent application Ser. No. 16/023,853. U.S. patent application Ser. No. 16/023,853 is hereby incorporated by reference in its entirety.

FIELD OF THE DISCLOSURE

This disclosure relates generally to electronic devices, and, more particularly, to dual screen electronic devices with stowable keyboards.

BACKGROUND

Dual screen electronic devices, such as dual screen laptops, typically lack a physical keyboard. The keyboard may appear as a display on one of the screens.

BRIEF DESCRIPTION OF THE DRAWINGS

FIG. 1A is a side view of an example electronic device with an example hinge and example keyboard in a closed position in accordance with the teachings of this disclosure.

FIG. 1B is a side view of a portion of the electronic device of FIG. 1A in a first open position.

FIG. 1C is a side view of a portion of the electronic device of FIG. 1A is a second open position.

FIG. 4A is a front perspective view of a portion of the example electronic device of FIGS. 1A-C with an example flexible printed circuit board and example cables.

FIG. 4B is a side view of the device of FIG. 4A.

FIG. 4C is a rear perspective view of a portion of the device of FIG. 4A.

FIGS. 9A and 9B are illustrations of the example electronic device during fabric assembly.

FIG. 10A is a side view of a portion of an example electronic device in an open position with a fabric cover.

FIG. 10B is side of the electronic device of FIG. 10A in a closed position.

The figures are not to scale. Instead, some portions may be enlarged for clarity. In general, the same reference numbers will be used throughout the drawing(s) and accompanying written description to refer to the same or like parts.

DETAILED DESCRIPTION

Figure 2A:
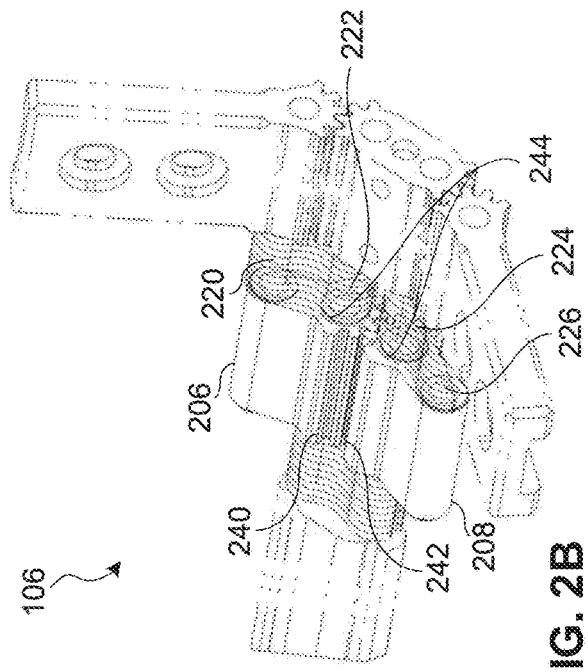
FIGS. 2A-2F are perspective views of one side of the hinge of FIG. 1B.

Dual screen electronic devices such as, for example, dual screen laptops, may provide a compromised typing experience due to a lack of a physical keyboard. If a user desires to use a physical keyboard with conventional dual screen electronic devices, the keyboard is typically carried separately as an accessory. A wireless keyboard as an accessory may be integrated as part of the cover. However, such keyboards are stored outside the electronic device, and the user needs to perform extra steps to set up the experience including unfolding the cover, opening the device, prompting keyboard in the right place, and performing all the same tasks in reverse order when closing the system.

Disclosed herein are example hinges that enable a physical keyboard to be stowed between halves of a closed electronic device with dual screens. A physical keyboard enhances the typing experience, and the example hinges disclosed herein enable a physical keyboard to become part of the electronic device. With the examples disclosed herein, a user does not need to carry a separate external keyboard accessory. Storage and transportation of external keyboards is inconvenient, and the example disclosed herein enable a user to transport a physical keyboard easily and effortlessly. In addition, the examples disclosed herein provide a system that is intuitive, easy to use, and immediately available when a user opens the electronic device.

FIG. 1A is a side view of an example electronic device 100. In the example of FIG. 1A, the electronic device 100 is a dual screen laptop. Other examples may include other electronic devices such as, for example, notebooks, mobile phones, e-readers, etc. The example electronic device 100 includes a first screen 102 and a second screen 104. As used herein "screen" indicates any suitable display, display panel, monitor, or presentation device. The first screen 102 and the second screen 104 are movably coupled via an example hinge assembly 106. The terms "hinge" and "hinge assembly" are used interchangeably throughout this disclosure. and an example keyboard 104 in a closed position in accordance with the teachings of this disclosure.

In the example of FIG. 1A, the electronic device 100 is in a closed mode or position. A first end 108 of the first screen 102 near the hinge 106 and a first end 110 of the second screen 104 near the hinge 106 are separated a first distance. A second end 112 of the first screen 102 opposite the hinge 106 and a second end 114 of the second screen 104 opposite the hinge 106 are separated a second distance. The second distance is less than the first distance such that the first screen 102 and the second screen 104 form a wedge-shaped profile when in the closed position that includes a gap 116. The hinge assembly 106 includes a first hinge pair 118 and a second hinge pair 120 that enable the electronic device 100 to have the wedge-shape and the gap 116 when in the closed position of FIG. 1A. A physical keyboard 122 is stowable in the gap 116. The keyboard 122 is separable or removable from the first screen 102 and the second screen 104.

FIG. 1B is a side view of a portion of the electronic device 100 of FIG. 1A in a first open position. In this example, the first open position corresponds to a laptop position or mode. FIG. 1C is a side view of a portion of the electronic device 100 of FIG. 1A is a second open position. In this example, the second open position corresponds to a lay flat position or mode. FIGS. 1A-C show the hinge assembly 106 enabling 180 degrees of rotation between the first screen 102 and the second screen 104. In other examples, the first hinge pair 118 and the second hinge pair 120 enable 360 degrees of rotation between the first screen 102 and the second screen 104.

Figure 2B:
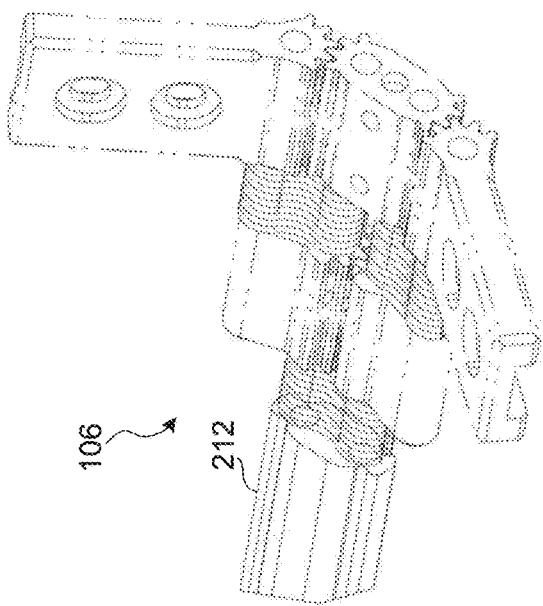
Figure 2C:
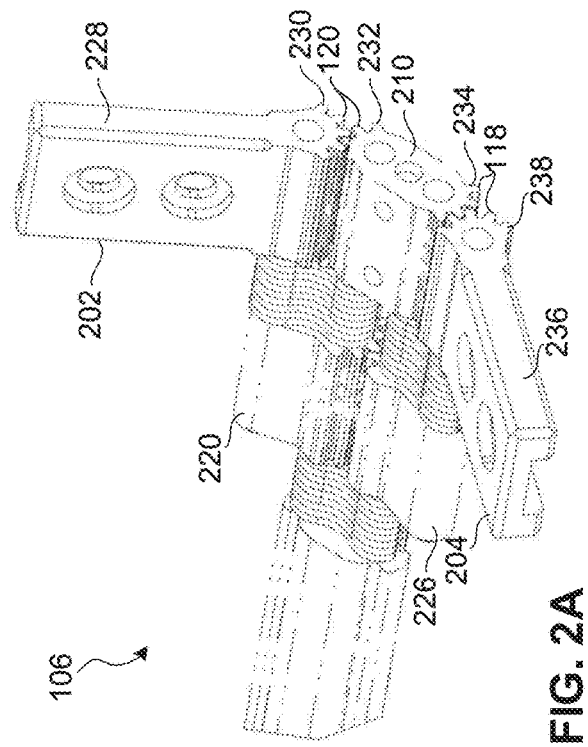
Figure 2D:
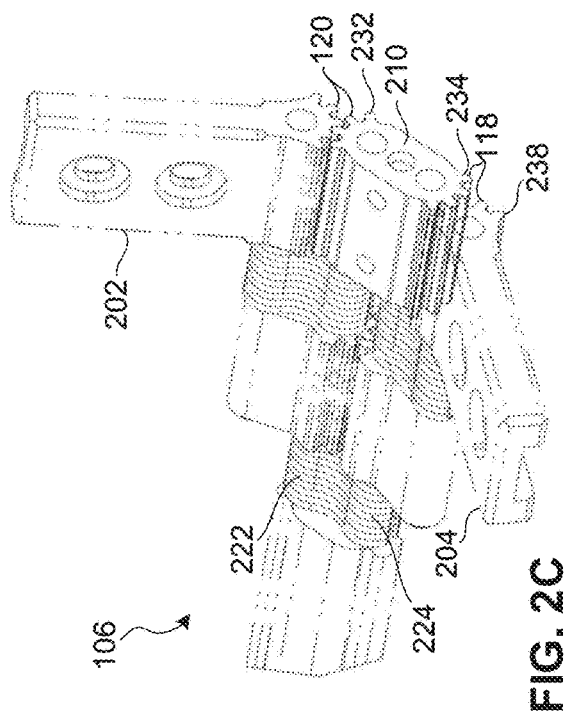
Figure 2E:
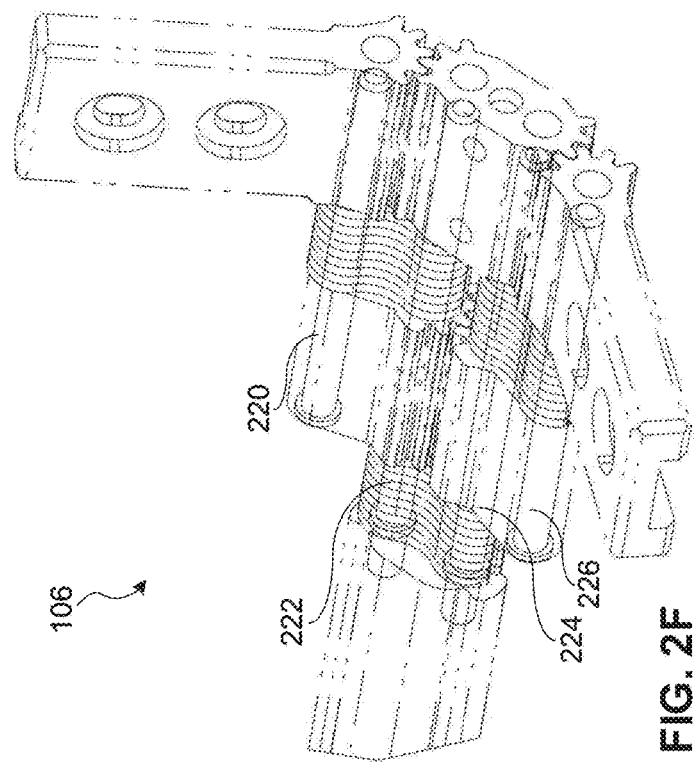
Figure 2G:
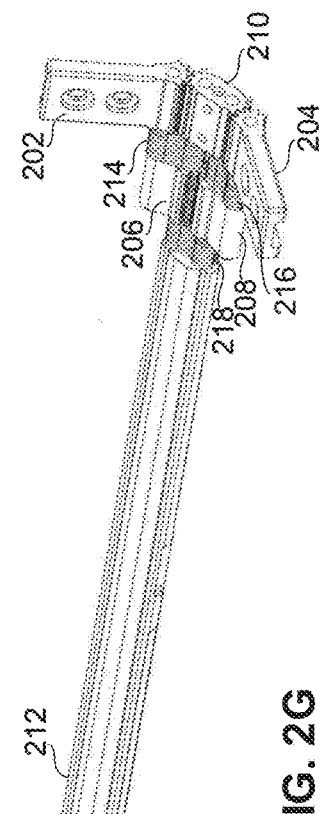
FIG. 2G is a perspective view of the hinge of FIG. 1B.
Figure 2F:
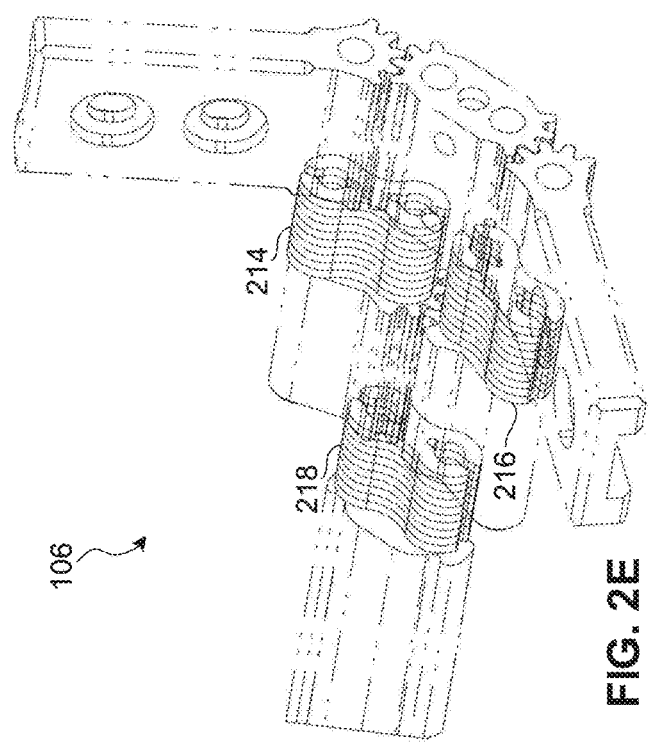

FIGS. 2A-2F are perspective views of one side of the hinge assembly 106 in the first open position of FIG. 1B. FIG. 2G is a perspective view of the full hinge assembly 106 in the first open position of FIG. 1B. In this example, the hinge assembly 106 includes an example first gear 202 and an example second gear 204 as shown in FIG. 2A. The hinge assembly 106 also includes an example first sync gear 206 and an example second sync gear 208 as shown in FIG. 2B. The hinge assembly 106 also includes an example link gear 210 as shown in FIG. 2C. The hinge assembly 106 also includes an example cable cover 212 as shown in FIG. 2D. The hinge assembly 106 also includes an example first set of torque plates 214, an example second set of torque plates 216, and an example third set of torque plates 218 as shown in FIG. 2E. The hinge assembly 106 also includes an example first hinge pin 220, an example second hinge pin 222, an example third hinge pin 224, and an example fourth hinge pin 226 as shown in FIG. 2F.

In the illustrated example, the first gear 202 is a spur gear that is a stationary spur gear that includes an extension 228 (FIG. 2A). The extension 228 is mounted in the chassis of the second screen 104. The first gear 202 is a stationary gear because the first gear 202 does not move relative to the chassis of the second screen 104. Rather, movement of the first gear 202 causes movement of the second screen 104.

The first gear 202 has a spurred or toothed end 230 that meshes with and rotatably engages a first spurred or toothed end 232 of the link gear 210. In this example, the link gear 210 is a spur gear that has the first toothed end 232 and a second toothed end 234 (FIG. 2C).

The second gear 204 is a spur gear that is a stationary spur gear that includes an extension 236 (FIG. 2A). The extension 236 is mounted in the chassis of the first screen 102. The second gear 204 is a stationary gear because the second gear 204 does not move relative to the chassis of the first screen 102. Rather, movement of the second gear 204 causes movement of the first screen 102.

The second gear 204 has a spurred or toothed end 238 that meshes with and rotatably engages the second toothed end 234 of the link gear 210 (FIGS. 2A and 2C). Thus, the link gear 210 couples the first gear 202 and the second gear 204.

As shown in the example of FIGS. 2A and 2F, the first hinge pin 220 provides a first axis of rotation about which the first gear 202 is able to be rotated. The fourth hinge pin 226 provides a fourth axis of rotation about which the second gear 204 is able to be rotated. As shown in FIGS. 2C and 2F, the second hinge pin 222 provides a third axis of rotation about which the link gear 210 is able to be rotated. The link gear is also rotatable about a fourth axis of rotation provided by the third hinge pin 224. In the illustrated example, the first axis of rotation, the second axis of rotation, the third axis of rotation, and the fourth axis of rotation are parallel.

The example hinge assembly 106 also includes the first sync gear 206 and the second sync gear 208 as shown in FIG. 2B. In the illustrated example, the first sync gear 206 and the second sync gear 208 are spur gears. The first sync gear 206 has a spurred or toothed end 240 that meshes with and rotatably engages a spurred or toothed end 242 of the second sync gear 208. The engagement of the toothed end 240 of the first sync gear 206 with the toothed end 242 of the second sync gear 208 form a third hinge pair 244 between the first screen 102 and the second screen 104.

As shown in FIGS. 2B and 2F, the first sync gear 206 is rotatable about the first axis of rotation provided by the first hinge pin 220 and the third axis of rotation provided by the second hinge pin 222. The first sync gear 206 is adjacent the first gear 202 along the first hinge pin 220. The first sync gear 206 also is adjacent the link gear 210 along the second hinge pin 222. In this example, the first sync gear 206 is indirectly adjacent to the first gear 202 and the link gear 210.

The second sync gear 208 is rotatable about the fourth axis of rotation provided by the third hinge pin 224 and the second axis of rotation provided by the fourth hinge pin 226. The second sync gear 208 is adjacent the link gear 210 along the third hinge pin 224. The second sync gear 208 also is adjacent the second gear 204 along the fourth hinge pin 226. In this example, the second sync gear 208 is indirectly adjacent to the link gear 210 and the second gear 204. The sync gears 206, 208 are used to synchronize the gear rotation, allowing synchronous 360 degree rotation and a smooth user experience.

FIG. 2D shows the example cable cover 212. The cable cover 212 has lead through openings for flexible printed circuits and cables and allows signals to be routed through the hinge assembly 106. In some examples, such as with cable connectors, the cable cover 212 can be split into two parts and/or formed from two cable covers.

FIG. 2E illustrates the first set of torque plates 214, the second set of torque plates 216, and the third set of torque plates 218. FIG. 2F shows the positioning and interaction of the torque plates 214, 216, 218 and the hinge pins 220, 222, 224, 226. The torque plates 214, 216, and 218 and the hinge pins 220, 222, 224, 226 are part of the hinge assembly 106 disposed between the first screen 102 and the second screen 104. The torque plates 214, 216, and 218 and the hinge pins 220, 222, 224, 226 generate friction for the hinge assembly 106.

In the illustrated example of FIG. 2E, each of the sets off torque plates includes 10 individual torque plates disposed side-by-side. Thus, in this example, the first set of torque plates 214 includes ten torque plates, the second set of torque plates 216 includes ten torque plates, and the third set of torque plates 218 includes ten torque plates. In other examples, other numbers of torque plates may be included in each set including, for example, one, two, three . . . eleven, twelve, etc. Also, in some examples, any of the sets of torque plates 214, 216, 218 may include a different number of torque plates than any of the other sets of torque plates 214, 216, 218. The torque plate quantity and thickness is based on needed friction, which depends multiple parameters including, for example, device size, weight, material selection, etc.

Furthermore, in the illustrated example, the individual torque plates are disposed next to other torque plates in the respective sets of torque plates, but the torque plates are not coupled to each other. In other examples, torque plates in a set of torque plates may be mechanically or chemically fastened to each other.

The first set of torque plates 214 is positioned, in this example, adjacent and between the first sync gear 206 and both the first gear 202 and the link gear 210. The first set of torque plates 214 is rotatable about the first axis of rotation provided by the first hinge pin 220 along with the first gear 202 and the first sync gear 206. The first set of torque plates 214 also is rotatable about the third axis of rotation provided by the second hinge pin 222 along with the link gear 210 and the first sync gear 206.

The second set of torque plates 216 is positioned, in this example, adjacent and between the second sync gear 208 and both link gear 210 and the second gear 204. The second set of torque plate 216 is rotatable about the fourth axis of rotation provided by the third hinge pin 224 along with the link gear 210 and the second sync gear 208. The second set of torque plates 216 also is rotatable about the second axis of rotation provided by the fourth hinge pin 226 along with the second sync gear 208 and the second gear 204.

The third set of torque plates 218 is positioned, in this example, adjacent and between the cable cover 212 and both the first sync gear 206 and the second sync gear 208. The third set of torque plates 218 is rotatable about the third axis of rotation provided by the second hinge pin 222 along with the first sync gear 206, the first set of torque plates 214, and the link gear 210. The third set of torque plates 218 also is rotatable about the fourth axis of rotation provided by the third hinge pin 224 along with the second sync gear 208, the second set of torque plates 216, and the link gear 210.

In the illustrated example, the torque plates 214, 216, 218 are forced on the respective hinge pins 220, 222, 224, 226 via a friction fit. The friction is generated by holes in the torque plates have diameters smaller than the respective diameters of the corresponding hinge pins 220, 222, 224, 226.

FIG. 2G shows the full hinge assembly 106. FIG. 2G shows that in this example, the combination of the gears 202, 204, 206, 208, 210, the torque plates 214, 216, 218, and the hinge pins 220, 222, 224, 226, are duplicated on both sides of the hinge assembly 106. In this example, the hinge assembly 106 is symmetrical, for example each side is mirrored on the other side. Some or all of the components of the hinge assembly 106 provide means for rotatably coupling the first screen 102 and the second screen 104 to enable the first screen 102 and the second screen 104 to move from an open position to a closed position. The means for rotatably coupling the first screen 102 and the second screen 104 enables 360 degrees of rotation between the first screen 102 and the second screen 104.

Figure 3A:
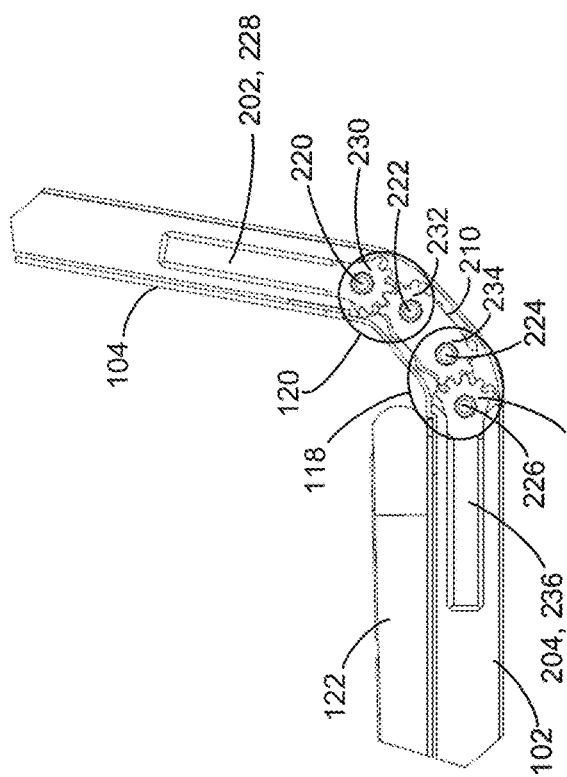
FIG. 3A is an enlarged side view of first and second example hinge pairs including the components of FIGS. 2A and 2C that enable rotation of the electronic device of FIGS. 1A-C.
Figure 3B:
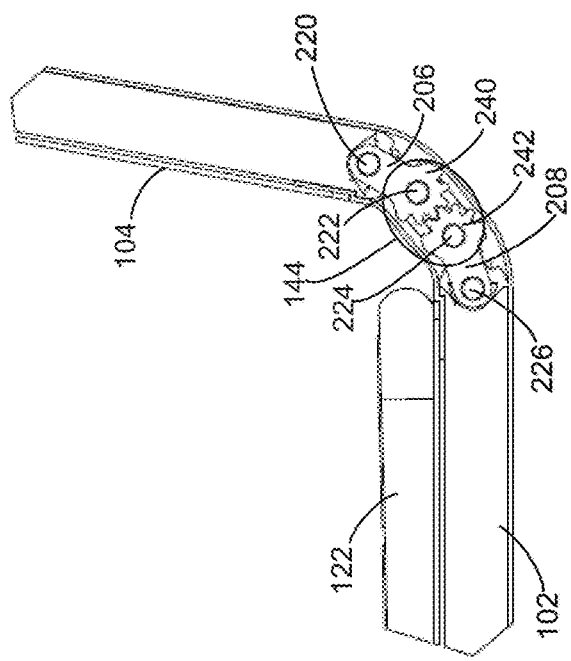
FIG. 3B is an enlarged side view of a third example hinge pair including the components of FIG. 2B that enable rotation of the electronic device of FIGS. 1A-C.

FIG. 3A is a side view of the first hinge pair 118 and the second hinge pair 120 in the electronic device 100 as positioned in the open position of FIG. 1B. The first hinge pair 118 and the second hinge pair 120 includes the components of FIGS. 2A and 2C that enable rotation of the electronic device 100 as disclosed above. FIG. 3B is a side view of the third hinge pair 244 in the electronic device 100 as positioned in the open position of FIG. 1B. The third hinge pair includes the components of FIG. 2B that enable rotation of the electronic device 100.

Figure 3C:
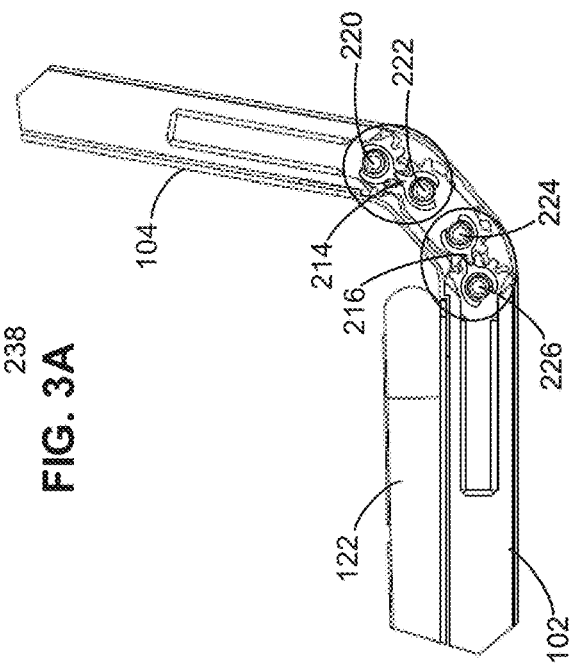
FIG. 3C is an enlarged side view of first and second example sets of torque plates of FIG. 2E that generate friction in the electronic device of FIGS. 1A-C.
Figure 3D:
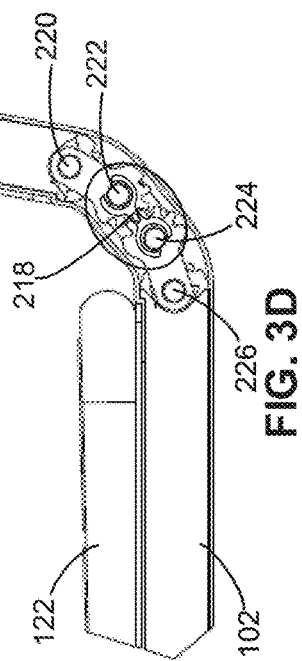
FIG. 3D is an enlarged side view of a third example set of torque plates of FIG. 2E that generates friction in the electronic device of FIGS. 1A-C.

FIG. 3C is a side view of the first set of torque plates 214 and the second set of torque plates 216 of FIG. 2E that generate friction in the electronic device 100. FIG. 3D is a side view of the third set of torque plates 218 of FIG. 2E that generates friction in the electronic device 100. Collectively, FIGS. 3A-3B illustrate synchronization of the components of the hinge assembly 106.

FIG. 4A is a front perspective view of a portion of the example electronic device 100 with an example flexible printed circuit board 402 and example cables 404. FIG. 4B is a side view of the device of FIG. 4A. FIG. 4C is a rear perspective view of the device of FIG. 4A. The flexible printed circuit board 402 is routed from the chassis of the first screen 102 to the chassis of the second screen 104 via the hinge assembly 106. In addition, the cables 404 are routed from the chassis of the first screen 102 to the chassis of the second screen 104 via the hinge assembly 106. A portion of the flexible printed circuit board 402 and portions of the cables 404 are disposed through the cable cover 212. The flexible printed circuit board 402 and the cables 404 can be accessed for servicing, for example, by removable of one or both of the displays of the first screen 102 and/or second screen 104 and without, for example, disassembling the exterior of the electronic device 100.

Figure 5B:
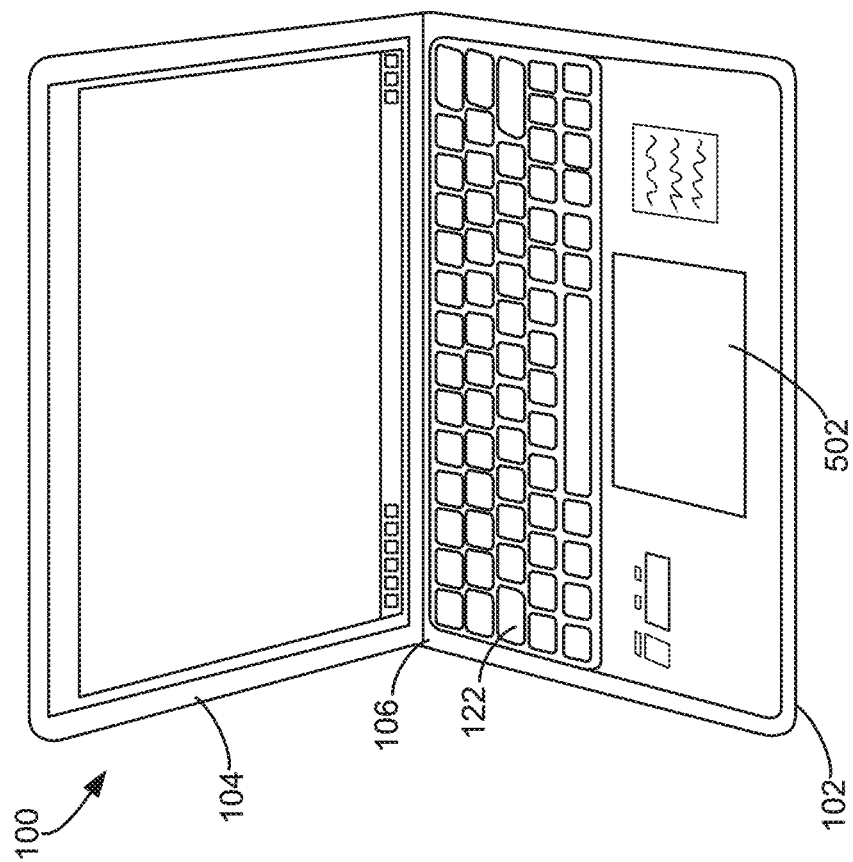
FIG. 5B is an illustration of the example electronic device of FIG. 5A in an open position with an example keyboard in a first position.
Figure 5A:
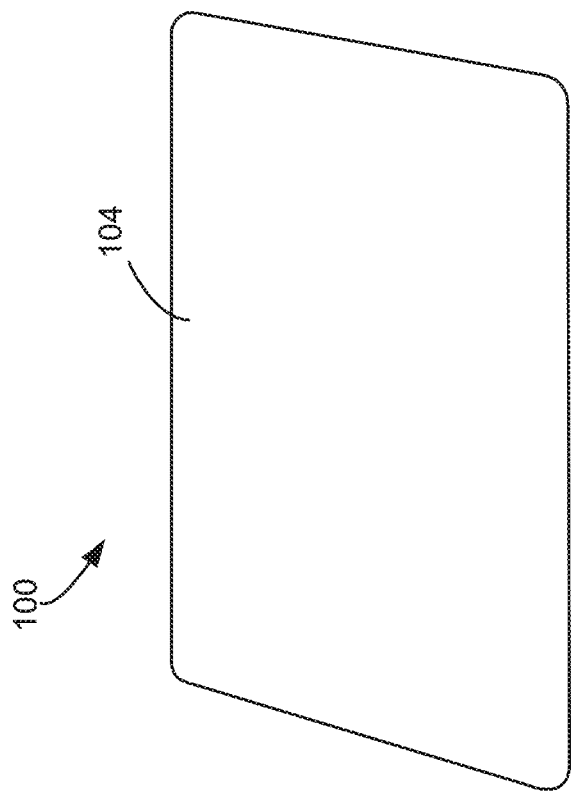
FIG. 5A is an illustration of an example electronic device in a closed position.
Figure 5C:
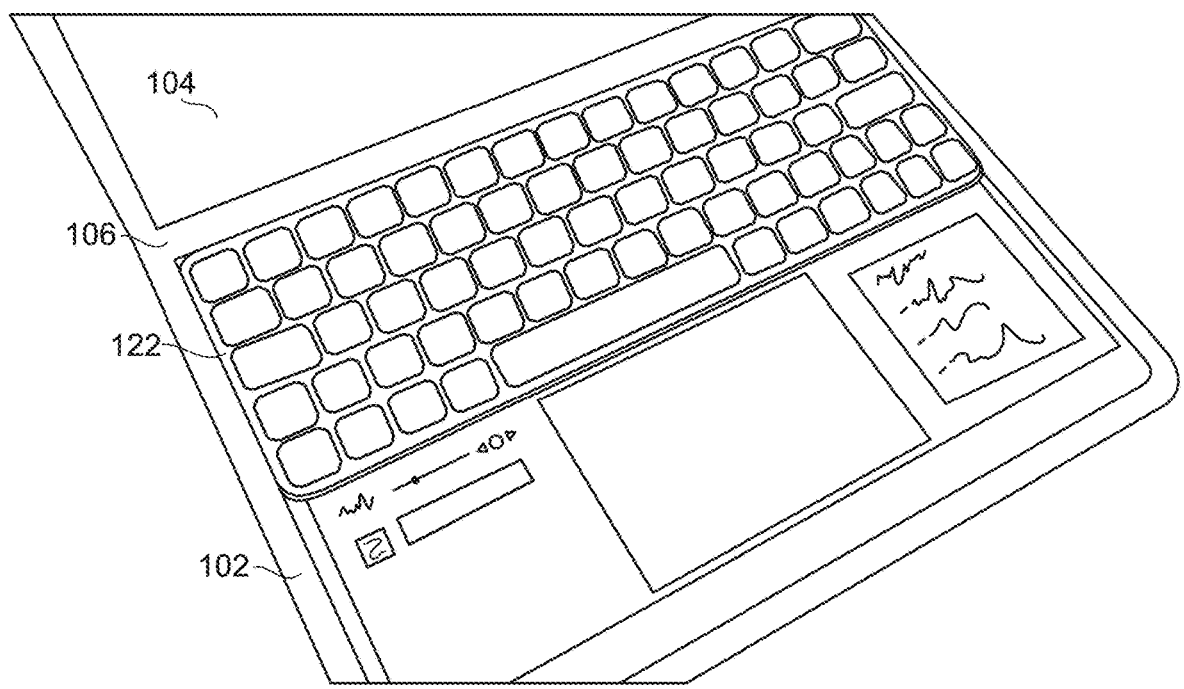
FIG. 5C is an enlarged view of the example device of FIG. 5B.
Figure 5D:
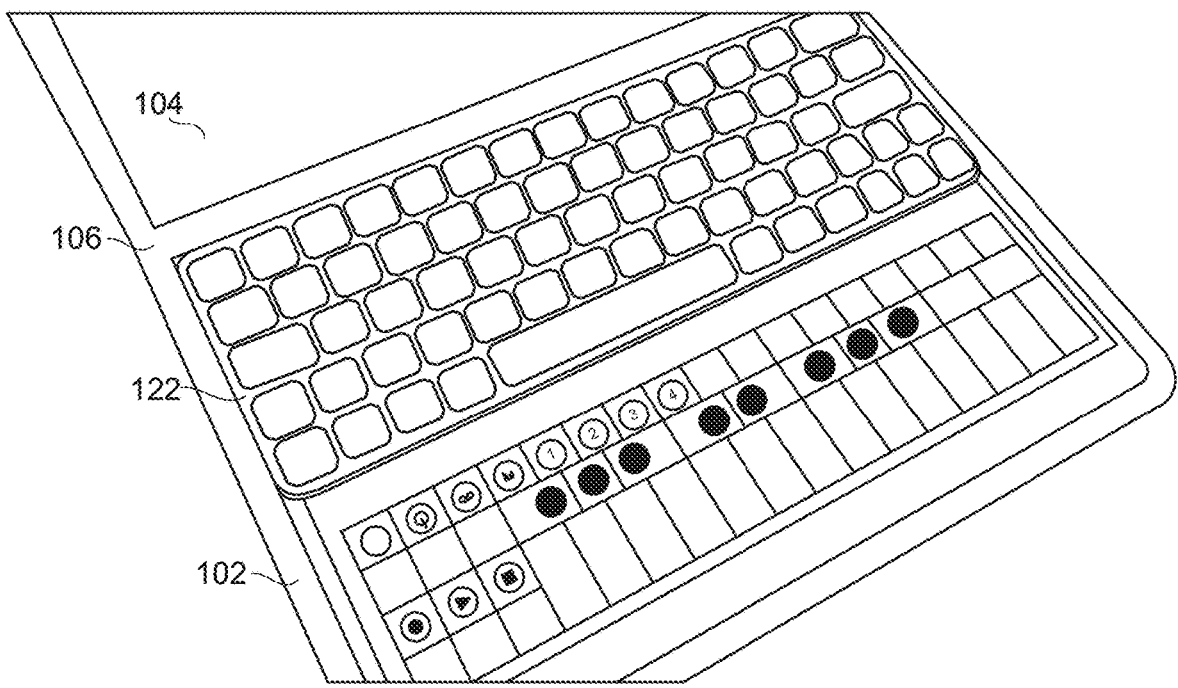
FIG. 5D is an illustration of the example device of FIG. 5B with an alternative display.
Figure 5E:
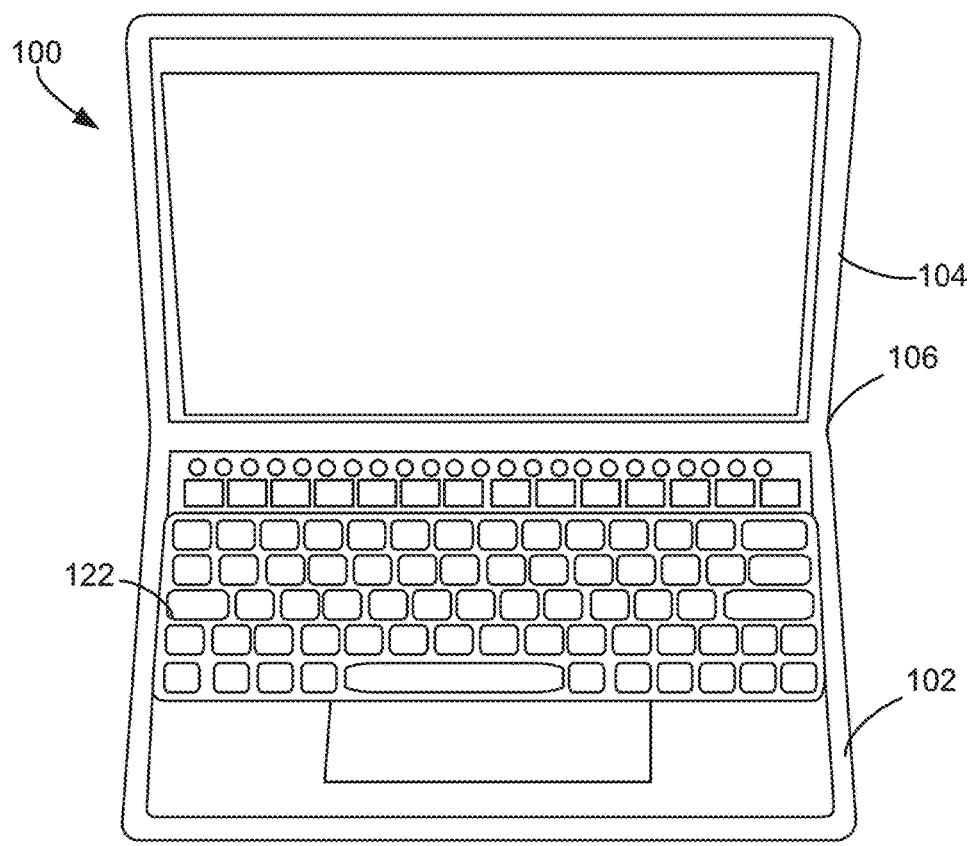
FIG. 5E is an illustration of the example electronic device of FIG. 5A in an open position with the example keyboard in a second position.
Figure 5F:
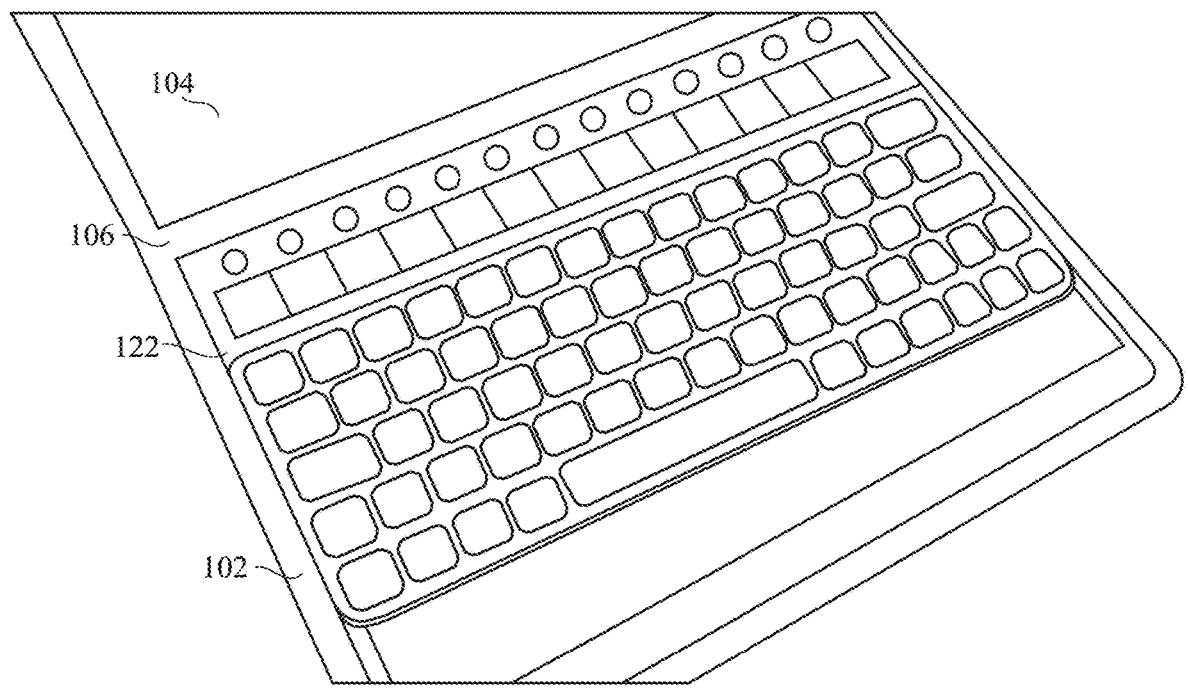
FIG. 5F is an enlarged view of the example device of FIG. 5E.
Figure 5G:
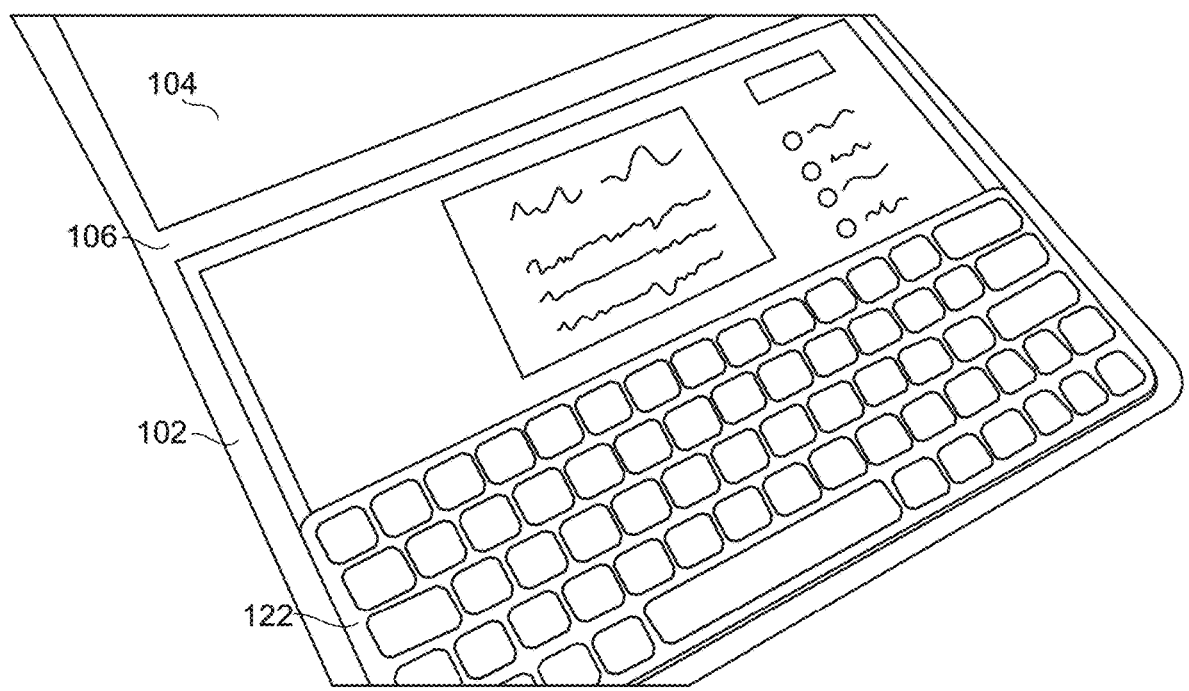
FIG. 5G is an illustration of the example electronic device of FIG. 5A in an open position with the example keyboard in a third position.
Figure 5H:
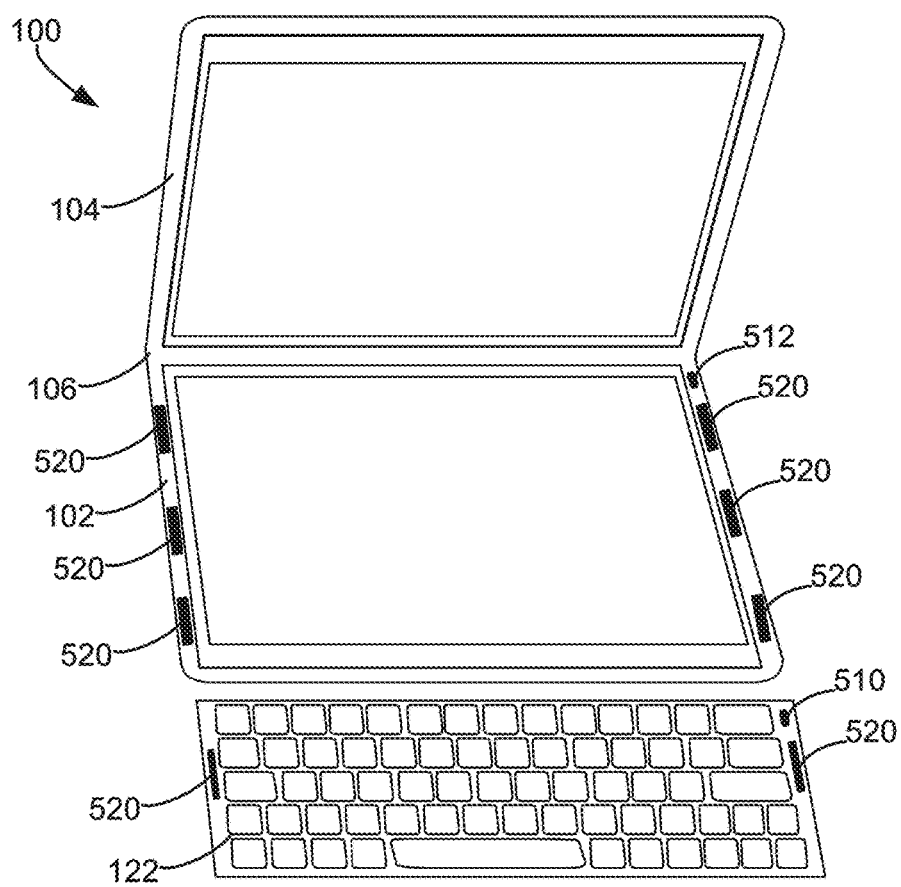
FIG. 5H is an illustration of the example electronic device of FIG. 5A in an open position with the example keyboard in a fourth position.

FIG. 5A shows the example electronic device 100 in a closed position similar to FIG. 1A with the keyboard 122 stowed therein. FIGS. 5B-5H show that the keyboard 122 may be used with the first screen 102 and second screen 104 in a plurality of positions. For example, in FIGS. 5B-D the keyboard 122 is positioned on the first screen 102 in a first position near the hinge 106. In FIGS. 5E and 5F, the keyboard 112 is positioned on the first screen 102 in a second position further from the hinge 106 than the first position of FIG. 5B. In FIG. 5G, the keyboard 122 is positioned on the first screen 102 in a third position further from the hinge 106 than the first position of FIG. 5B and the second position of FIG. 5E. In FIG. 5H, the keyboard 122 is positioned off of the first screen 102.

The visual display on the first screen 102 and the second screen 104 and the mode of the electronic device 100 changes as the keyboard 122 is slid or otherwise rearranged or moved to different positions on the first screen 102. For example, with the keyboard 122 in the position of FIG. 5B, a touchpad 502 appears on the lower portion of the first screen 102. FIG. 5C is an enlarged view of the first screen 102 of FIG. 5B. FIG. 5C is also an enlarged view of the first screen 102 with the keyboard 122 in the first position closer to the hinge 106. FIG. 5D shows an alternative display, specifically example piano keys. Thus, when the keyboard is in the first position closer to the hinge 106, the second of the first screen 102 closer to the user (e.g., where a user would rest his or her palms) enables a plurality of interactions and tools. The size and the position of the first screen 102 are easily and comfortably reached. In addition, the track pad is flexible and customizable so that the user can select a display and/or other tools for use on the first screen 102 in the area between the keyboard 122 and the user including, for example, the track pad, notes, a midi controller, a piano, a sketch surface, and other tools and/or functionality.

In another example, when the keyboard 122 is moved towards the user (e.g., the keyboard 122 is slid down or otherwise repositioned on the first screen 102), the user interface can prompt contextual interactions and/or other tools and functionality. For example, with the keyboard 122 in the position of FIG. 5E, a function key (e.g., F1-F12) bar and an emoji bar appear on the first screen 102 between the keyboard 122 and the hinge 106. FIG. 5F is an enlarged view of the first screen 102 of FIG. 5E. In this example, the user interface reacts to change in the screen positioning and sizing. The additional tools and/or functionality in this example include contextual interactions, emoji, predictive text, music controls, etc.

In another example, as illustrated in FIG. 5G, the keyboard 122 is moved to another position on the first screen 102 further from the hinge 106. In this example, the keyboard 122 is on top of the first screen 102, at or near the edge closer to the user. In this example, the display of the first screen 102 above the keyboard 122 (i.e., closer to the hinge 106) has a larger area than shown in the example of FIG. 5E. The user interface reacts to change in the screen positioning and sizing. The additional tools and/or functionality in this example include multitasking performance such as, for example, chats, social media, broadcast user interface, etc. Other display types may be used in other examples.

In yet another example, with the keyboard 122 in the position of FIG. 5H, the first screen 102 becomes a full image display. In other examples, other screen configurations, displays, and/or functionalities may be presented.

In these examples, there is a fluid dual screen/keyboard user experience. In this example, the first screen 102 animates real-time reacting to the position of the keyboard 122. The reaction of the first screen 102 to the position of the keyboard allows for new paradigms of user interaction with the electronic device 100. As the user slides the keyboard 122 down or otherwise moves the keyboard 122 on the first screen 102 or off of the first screen 102, the user can access different functionalities including, for example, shifting touchpad user interfacing and/or operating system softkeyboard functionality (such as, for example, predictive text, notifications, emoji, pen-input, voice-input, etc.). The adaptation of the first screen 102 to the position of the keyboard also allows for dynamic shifting app extensions and/or toolbars.

In the illustrated example, the keyboard 122 is wirelessly coupled to the electronic device 100 using, for example, Bluetooth or any suitable communication means. In this example, keyboard 122 automatically pairs and charges with the electronic device 100 via a keyboard transceiver 510 and a corresponding transceiver 512 on the electronic device 100 (see FIG. 5H). In addition, in this example, the keyboard 122 sits on top of the surface of the first screen 102 and may be slid therealong. In some examples, the keyboard 122 is help into one or more positions via magnets 520 (see FIG. 5H). Other suitable modes and means for communicatively and/or physically coupling the keyboard 122 to the electronic device 100 may be used.

Figure 6:
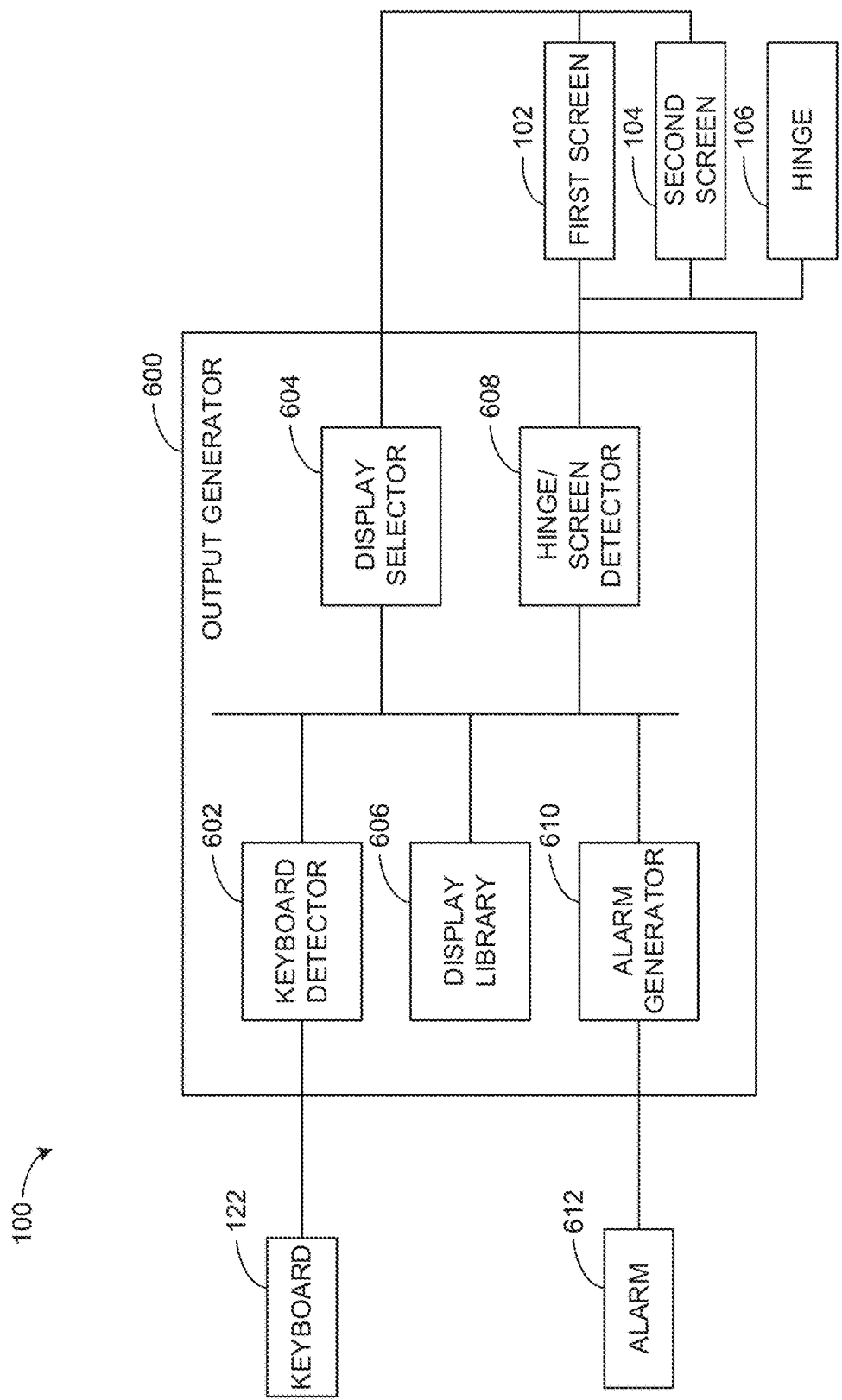
FIG. 6 is a block diagram of portions of the electronic device of FIGS. 1A-C including an example output generator.

FIG. 6 is a block diagram of portions of the electronic device 100 including an example output generator 600. The output generator 600 generates displays, interfaces, alarms, and other suitable output based on the position of one or more of the first screen 102, the second screen 104, the hinge 106, and/or the keyboard 122. The output generator 600 provides the dynamic user interface action and reactions disclosed above.

The output generator 600 includes an example keyboard detector 602. The keyboard detector 602 provides means for detecting the position or placement of the keyboard 122. For example, the keyboard detector 602 determines if the keyboard 122 is positioned on the first screen 102 close to the hinge 106 as shown in FIG. 5B. The keyboard detector 602 detects the position of the keyboard 122 on the first screen 102, the second screen 104, and/or off of either screen 102, 104 such as, for example, as shown in FIG. 5D.

The output generator 600 also includes an example display selector 604. The example display selector 604 provides means for selecting a display including, for example, a user interface. The display selector 604 selects the display based on the position of the keyboard 122 as indicated by the keyboard detector 602. The display selector 604 accesses a display library 606 to select a display for presentation on the first screen 102 and/or the second screen 104. As disclosed above, the display may include full screen displays, tool bars, emoji bars, touchpads, function keys, and/or any other suitable user interfacing and/or operating system functionality.

The output generator 600 also includes an example hinge/screen detector 608. The hinge/screen detector 608 provides means for detecting the closed position of the electronic device 100 and one or more of the open positions. The hinge/screen detector 608 detects the position of the hinge 106 and/or the position of one or more of the first screen 102 or the second screen 104. The position of the first screen 102, the second screen 104, and/or the hinge 106 is indicative of the operating mode of the electronic device including, for example, a laptop mode, a flat mode, a book mode, a tent mode, a tablet mode, or a power down and closed mode. The display selector 604 may select the display also based on the position of the first screen 102, the second screen 104, and/or the hinge 106.

The output generator 600 also includes an example alarm generator 610. The example alarm generator provides means for providing a notice or an alarm 612 based on the position of the keyboard 122 and the first screen 102, the second screen 104, and/or the hinge 106. The alarm generator 610 uses data from the keyboard detector 602 and data from the hinge/screen detector 608 to determine if the electronic device 100 is in the closed position and if the keyboard 122 is positioned on the first screen 102 or the second screen 104 and located within the gap 116. If the hinge/screen detector 608 detects that the hinge 106 and/or the screens 102, 104 are in the closed position, and the keyboard detector 602 detects that the keyboard 122 is located on the first screen 102 or the second screen 104, the alarm generator 610 determines that the keyboard 122 is properly stowed and does not generate the alarm 612. However, if he hinge/screen detector 608 detects that the hinge 106 and/or the screens 102, 104 are in the closed position, and the keyboard detector 602 detects that the keyboard 122 is not located on the first screen 102 or the second screen 104, the alarm generator 610 determines that the keyboard 122 is missing and not properly stowed. The alarm generator 610 generates the alarm 612 in this example to warn the user about the missing keyboard 122.

While an example manner of implementing the example electronic device 100 of FIGS. 1A-C is illustrated in FIG. 6, one or more of the elements, processes and/or devices illustrated in FIG. 6 may be combined, divided, re-arranged, omitted, eliminated and/or implemented in any other way. Further, the example keyboard detector 602, the example display selector 604, the example display library 606, the example hinge/screen detector 608, the example alarm generator 610, and/or, more generally, the example output generator 600 of FIG. 6 may be implemented by hardware, software, firmware and/or any combination of hardware, software and/or firmware. Thus, for example, any of the example keyboard detector 602, the example display selector 604, the example display library 606, the example hinge/screen detector 608, the example alarm generator 610, and/or, more generally, the example output generator 600 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, keyboard detector 602, the example display selector 604, the example display library 606, the example hinge/screen detector 608, the example alarm generator 610, and/or the example output generator 600 is/are hereby expressly defined to include a non-transitory computer readable storage device or storage disk such as a memory, a digital versatile disk (DVD), a compact disk (CD), a Blu-ray disk, etc. including the software and/or firmware. Further still, the example electronic device 100 and/or output generator 600 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the output generator 600 of FIG. 6 is shown in FIG. 6. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example output generator 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Figure 7:
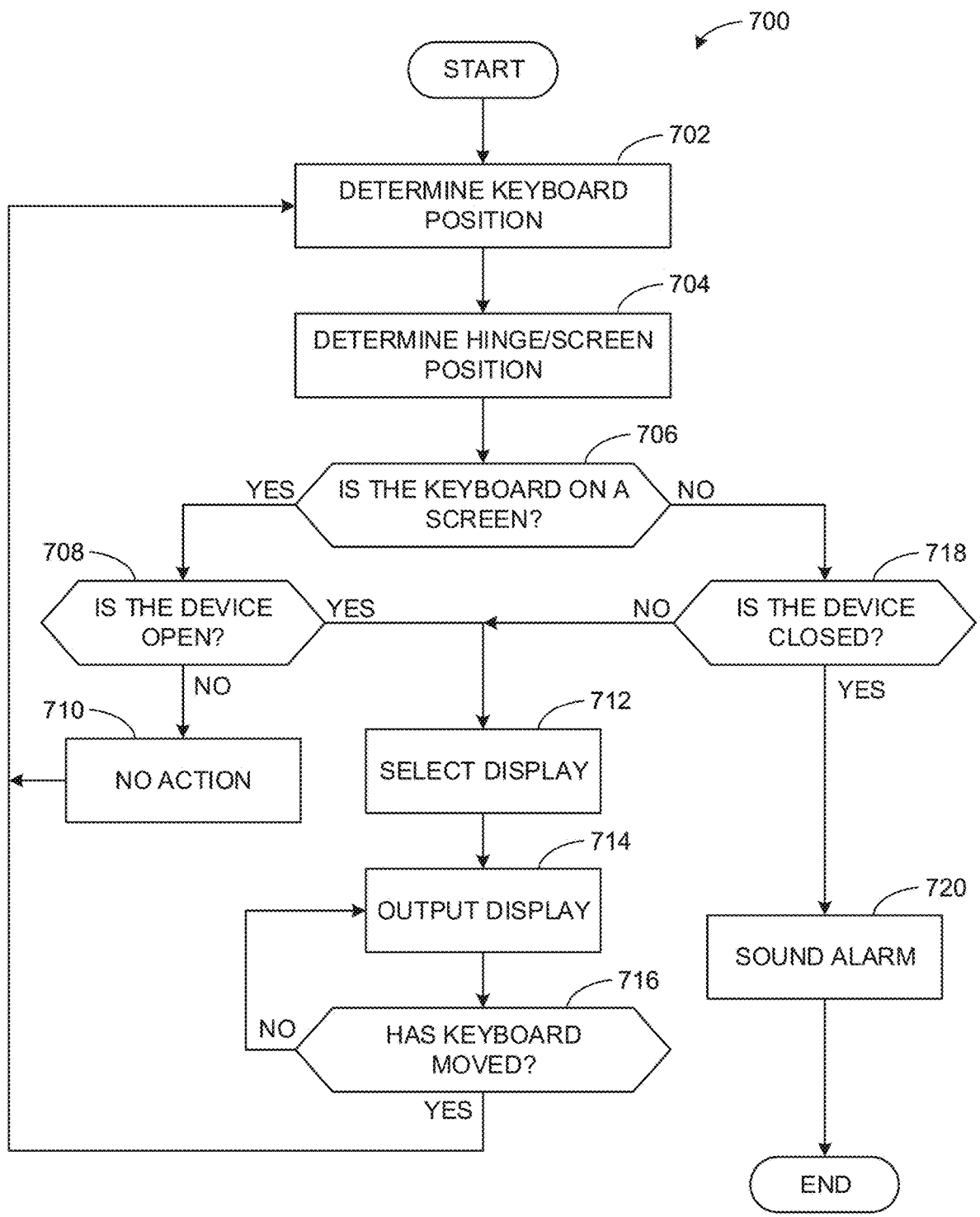
FIG. 7 is a flowchart representative of machine readable instructions which may be executed to implement the portions of the electronic device and the output generator of FIG. 6.

In execution of the program 700 of FIG. 7, the keyboard detector 602 of the output generator 600 determines the position of the keyboard 122 (block 702). In addition, the hinge/screen detector 608 determines the position of one or more of the first screen 102, the second screen 104, and/or the hinge 106 (block 704). The display selector 604 and the alarm generator 610 determine if the keyboard 122 is positioned on the first screen 102 or the second screen 104 based on data from the keyboard detector 602 (block 706). In addition, the display selector 604 and the alarm generator 610 determine if the electronic device 100 is in an open position based on the data from the hinge/screen detector 608 (block 708).

If the keyboard 122 is located on a screen (block 706) and the electronic device 100 is not open (block 708), the display selector 604 takes no action and the alarm generator 610 takes no action (block 710). The display selector 604 take no action because the electronic device 100 is closed, and the alarm generator 610 takes no action because the keyboard 122 is properly stowed. The example program 700 then continues with the keyboard detector 602 detecting the position of the keyboard 122 (block 702) during a subsequent use of the electronic device 100.

If the keyboard 122 is located on a screen (block 706) and the electronic device 100 is open (block 708), the display selector 604 selector selects from the display library 606 what elements of a display to present to the user based on the position of the keyboard relative to the opened screens (block 712). The display selector 604 outputs the display to the screens 102, 104 (block 714).

The keyboard detector 602 determines if the keyboard 122 has been moved (block 716). If the keyboard 122 has not been moved, the display selector 604 continues to output the selected display (block 714). If the keyboard detector 602 detects that the keyboard 122 has been moved, example program 700 then continues with the keyboard detector 602 detecting the position of the keyboard 122 (block 702).

Returning to block 706, if the display selector 604 and the alarm generator 610 determine that the keyboard 122 is not positioned on the first screen 102 or the second screen 104 based on data from the keyboard detector 602 (block 706), the display selector 604 and the alarm generator 610 determine if the electronic device 100 is in a closed position based on the data from the hinge/screen detector 608 (block 718).

If the keyboard 122 is not on a screen 102, 104 (block 706) and the device 100 is not in a closed position (block 718), the display selector 604 selects a display for presentation on the screens 102, 104 (block 712). For example, the display selector 604 may select a two screen, full image display. The program 700 then continues as disclosed above.

If the keyboard 122 is not on a screen 102, 104 (block 706) and the device 100 is in a closed position (block 718), the alarm generator 610 determines that the keyboard 122 is not properly stowed and may be missing. The alarm generator 610 generates and sounds an alarm or otherwise outputs a notification that the keyboard 122 has not been stowed before the electronic device 100 was move to the closed position (block 720). The example program 700 then ends.

Figure 8:
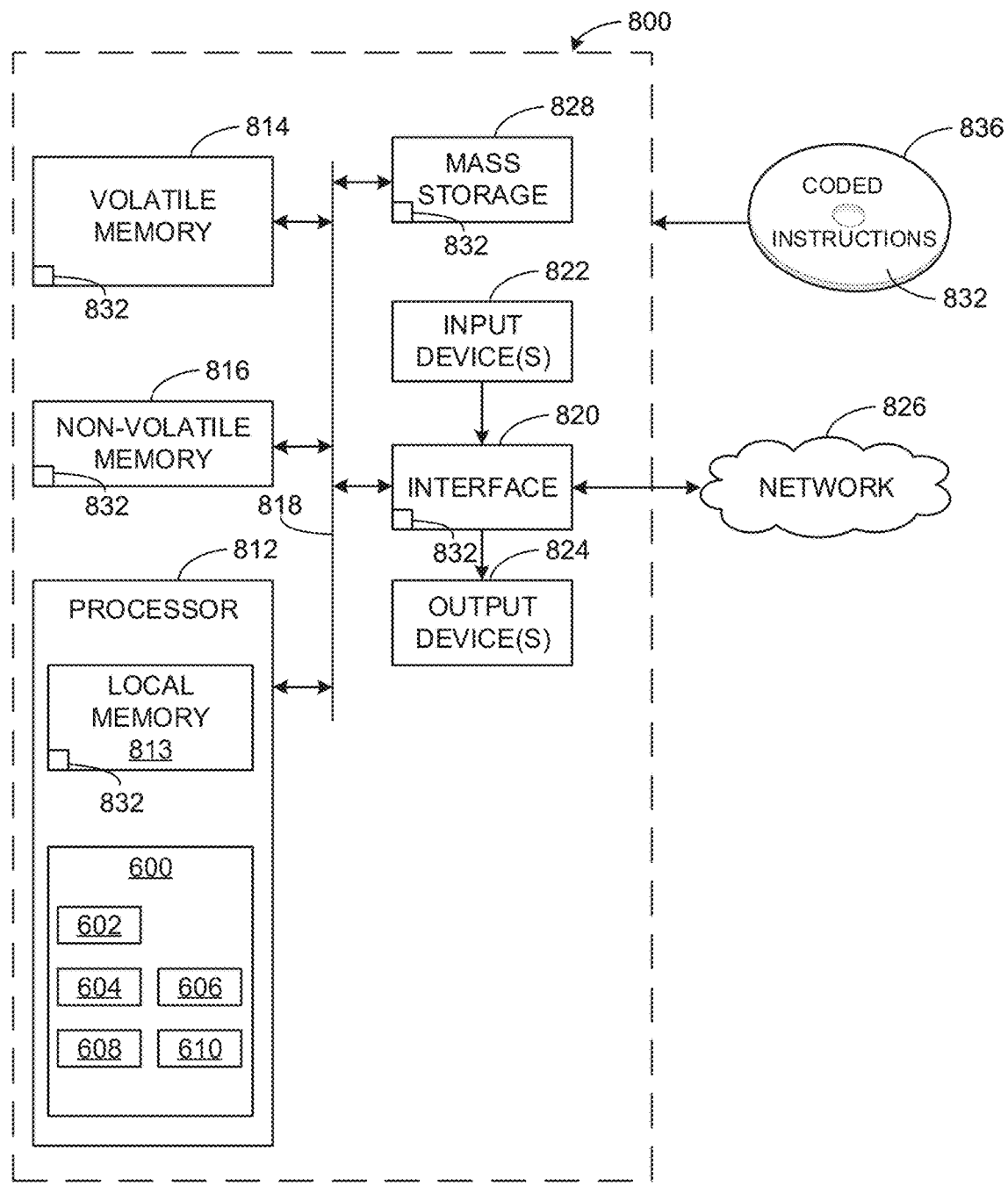
FIG. 8 is a block diagram of an example processing platform structured to execute the instructions of FIG. 7 to implement the portions of the electronic device and the output generator of FIG. 6.

FIG. 8 is a block diagram of an example processor platform 800 structured to execute the instructions of FIG. 7 to implement the electronic device 100 and/or output generator 600 of FIG. 6. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 812 implements the output generator 600, the keyboard detector 602, the display selector 604, the display library 606, the hinge/screen detector 608, and/or the alarm generator 610.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 7 may be stored in the mass storage device 828, in the volatile memory 814, in the non-volatile memory 816, and/or on a removable non-transitory computer readable storage medium such as a CD or DVD.

FIGS. 9A and 9B are illustrations of the electronic device 100 during fabric assembly. FIG. 9A is a rear view of the first screen 102, second screen 104, and hinge 106 as a fabric cover 900 is used to cover these elements. FIG. 9B is a front view of the electronic device 100 with the fabric cover 900 assembled. FIG. 10A is a side view of a portion of the example electronic device 100 in the open position with the fabric cover 900. FIG. 10B is side of the electronic device 100 and fabric cover 900 of FIG. 10A in the closed position.

The fabric cover 900 unifies the appearance of the front and rear of the first screen 102, second screen 104, and hinge 106. The fabric cover 900 also hides hinge structures and signal routing. The fabric cover 900 provides flexibility, durability, airflow, and tactility. In some examples, the fabric cover 900 is a thin symmetrical form with enhances aesthetics. Furthermore, the fabric cover facilities holding and lifting the electronic device 100.

From the foregoing, it will be appreciated that example apparatus, systems, articles of manufacture, and methods have been disclosed that include example hinges that enable a physical keyboard to be stowed between halves of a closed electronic device with dual screens. A physical keyboard enhances the typing experience, and the example hinges disclosed herein enable a physical keyboard to become part of the electronic device instead of requiring a user to acquire and carry a separate external keyboard accessory.

Furthermore, the examples disclosed herein include hinges that are not restricted by size or complexity and that facilitate the integrations of cables and flexible printed circuits. Further, these examples increase the amount of signals that can be lead through the hinge. Limited signal count limits where input/output ports can be placed (e.g. in a limited system, a USB may have to be located in the same half of the electronic device as the main printed circuit board). However, in the examples disclose herein, there is greater flexibility. More signals can be sent between the halves of the electronic device, which enables wider alternative for placement of, for example, input/output ports and overall device design.

In addition, the examples disclosed herein provide an enhanced user experience because the displays presented on the screens a dynamic and provide a fluid user interface based on the position of the keyboard. Thus, users can leverage the keyboard position to present additional and/or alternative functionality including different user interfaces and/or different operating system functions.

Examples disclosed herein include apparatus, systems, articles of manufacture, and methods that include example hinges that enable a physical keyboard to be stowed between halves of a closed electronic device with dual screens. Example 1 includes a device that includes a first screen having a first end and a second end and a second screen having a first end and a second end. The device of Example 1 also includes a hinge assembly to couple the first screen and the second screen. In Example 1, the hinge assembly includes a first hinge pair and a second hinge pair, the first hinge pair and the second hinge pair to cause the first end of the first screen and the first end of the second screen to be separated a first distance when the device is in a closed position. In Example 1, the second end of the first screen and the second end of the second screen are separated a second distance when the device is in a closed position, the second distance less than the first distance.

Example 2 includes the device of Example 1, wherein the device has a wedge-shaped profile in the closed position.

Example 3 includes the device of Example 1, wherein the first distance creates a gap when the device is in the closed position.

Example 4 includes the device of Example 3, and further includes a physical keyboard stowable in the gap.

Example 5 includes the device of Example 4, wherein the keyboard is magnetically couplable to at least one of the first screen or the second screen.

Example 6 includes the device of Example 4, wherein the keyboard is removably couplable to at least one of the first screen or the second screen.

Example 7 includes the device of Example 6, wherein the keyboard is couplable to a plurality of positions on at least one of the first screen or the second screen.

Example 8 includes the device of Example 7, and further includes a keyboard detector to detect a position of the keyboard relative to the first screen or second screen.

Example 9 includes the device of Example 8, and further includes a display selector to select a user interface to display based on the position of the keyboard.

Example 10 includes the device of Example 8, further including an alarm to output a notice if the device is moved from an open to the closed position without the keyboard detector detecting a presence of the keyboard.

Example 11 includes the device of Example 1, wherein the hinge assembly enables 360 degrees of rotation between the first screen and the second screen.

Example 12 includes the device of Example 1, wherein the first hinge pair includes a first gear coupled to a link gear.

Example 13 includes the device of Example 12, wherein the first gear is rotatably coupled to the link gear.

Example 14 includes the device of Example 12, wherein the first hinge pair includes a second gear coupled to the link gear.

Example 15 includes the device of Example 14, wherein the second gear is rotatably coupled to the link gear.

Example 16 includes the device of Example 14, wherein the first gear is coupled to a first end of the link gear and the second gear is coupled to a second end of the link gear, the second end opposite the first end.

Example 17 includes the device of Example 14, wherein the first gear includes a first extension disposed within a first chassis of the first screen and the second gear includes a second extension disposed within a second chassis of the second screen.

Example 18 includes the device of Example 1, and further includes a third hinge pair disposed between the first screen and the second screen.

Example 19 includes the device of Example 18, wherein the third hinge pair includes a first sync gear coupled to a second sync gear.

Example 20 includes the device of Example 19, and further includes a link gear, wherein the first sync gear is coupled to the link gear via a first hinge pin, and the second sync gear is couple to the link gear via a second hinge pin.

Example 21 includes the device of Example 1, and further includes a first torque plate and a second torque plate disposed between the first screen and the second screen.

Example 22 includes the device of Example 21, and further includes a first gear, a second gear, and a link gear, wherein the first torque plate is coupled to the first gear via a first hinge pin, the first torque plate is coupled to the link gear first a second hinge pin, the second torque plate is coupled to the link gear via a third hinge pin, and the second torque plate is coupled to the second gear via a fourth hinge pin.

Example 23 includes the device of Example 22, and further includes a third torque plate coupled to the second hinge pin and the third hinge pin.

Example 24 includes the device of Example 22, and further includes a third hinge pair disposed between the first screen and the second screen, wherein the third hinge pair includes a first sync gear coupled to a second sync gear, the first sync gear coupled to the first hinge pin and the second hinge pin, the second sync gear coupled to the third hinge pin and the fourth hinge pin.

Example 25 includes the device of Example 1, and further includes a flexible printed circuit disposed between the first screen, the first hinge pair, the second hinge pair, and the second screen.

Example 26 includes the device of Example 1, and further includes a fabric covering to cover the hinge assembly.

Example 27 includes a device that includes a first screen having a first end and a second end and a second screen having a first end and a second end. The device in Example 27 also includes a means for rotatably coupling the first screen and the second screen to enable the first screen and the second screen to move from an open position to a closed position. In Example 27, the first end of the first screen and the first end of the second screen are separated a first distance when the device is in the closed position, and the second end of the first screen and the second end of the second screen are separated a second distance when the device is in a closed position, the second distance less than the first distance.

Example 28 includes the device of Example 27, wherein the device has a wedge-shaped profile in the closed position.

Example 29 includes the device of Example 27, wherein the first distance creates a gap when the device is in the closed position.

Example 30 includes the device of Example 29, and further includes a physical keyboard stowable in the gap.

Example 31 includes the device of Example 30, and further includes means for coupling the keyboard to at least one of the first screen or the second screen.

Example 32 includes the device of Example 31, wherein the means for coupling the keyboard removably couples the keyboard to at least one of the first screen or the second screen.

Example 33 includes the device of Example 31, wherein the means for coupling the keyboard enables the keyboard to be coupled to a plurality of positions on at least one of the first screen or the second screen.

Example 34 includes the device of Example 33, and further includes means for detecting a position of the keyboard relative to the first screen or second screen.

Example 35 includes the device of Example 34, and further includes means for selecting a user interface to display based on the position of the keyboard.

Example 36 includes the device of Example 33, and further includes means for detecting the open position or the closed position. Example 36 also includes means for outputting a notice if the device is moved from the open to the closed position without the means for detecting a position of the keyboard detecting a presence of the keyboard on at least one of the first screen or the second screen.

Example 37 includes the device of Example 27, wherein the means for rotatably coupling enables 360 degrees of rotation between the first screen and the second screen.

Example 38 includes a method that includes placing a physical keyboard on the first screen of the device of Example 1 and rotating the hinge assembly to draw the second screen toward the first screen while the keyboard is placed on the first screen to close the device.

Example 39 includes a non-transitory computer readable storage medium that includes computer readable instructions that, when executed, cause one or more machines to, at least: detect a position of a physical keyboard relative to a screen of an electronic device; select a first user interface to display on the screen to the user when the keyboard is in a first position relative to the screen; and select a second user interface to display on the screen to the user when the keyboard is in a second position relative to the screen, the second position different from the first position.

Example 40 includes the storage medium of Example 39, wherein the screen is a first screen, the electronic device including a second screen that is hinged to the first screen, and wherein the instructions further cause the one or more machines to: detect when the second screen is moved from an open to a closed position; and output a notice if the second screen is moved from the open to the closed position without the detecting a presence of the keyboard on the first screen.

Example 41 includes a method that includes: detecting, by executing instructions with a processor, placement of a physical keyboard relative to a screen of an electronic device; selecting, by executing instructions with the processor, a first user interface to display on the screen to the user when the keyboard is in a first position relative to the screen; and selecting, by executing instructions with the processor, a second user interface to display on the screen to the user when the keyboard is in a second position relative to the screen, the second position different from the first position.

Example 42 includes the method of Example 41, wherein the screen is a first screen, the electronic device including a second screen that is hinged to the first screen, and wherein the method further includes: detecting, by executing instructions with the processor, when the second screen is moved from an open to a closed position; and outputting, by executing instructions with the processor, a notice if the second screen is moved from the open to the closed position without the detecting a presence of the keyboard on the first screen.

Example 43 includes an apparatus to couple a first screen and a second screen of an electronic device. The apparatus of Example 43 includes a first gear rotatable about a first axis of rotation and a second gear rotatable about a second axis of rotation. The apparatus of Example 43 also includes a link gear rotatably coupled to the first gear and rotatably coupled to the second gear.

Example 44 includes the apparatus of Example 43, wherein the link gear rotatable about a third axis of rotation and rotatable about a fourth axis of rotation.

Example 45 includes the apparatus of Example 44, wherein the first axis of rotation, the second axis of rotation, the third axis of rotation, and the fourth axis of rotation are parallel.

Example 46 includes the apparatus of Example 44, and further includes a first torque plate rotatable about the first axis of rotation adjacent the first gear and rotatable about the third axis adjacent the link gear.

Example 47 includes the apparatus of Example 46, and further includes a second torque plate rotatable about the second axis of rotation adjacent the second gear and rotatable about the fourth axis of rotation adjacent the link gear.

Example 48 includes the apparatus of Example 47, and further includes a first sync gear rotatable about the first axis of rotation and rotatable about the third axis of rotation adjacent the first torque plate.

Example 49 includes the apparatus of Example 48, and further includes a second sync gear rotatable about the second axis of rotation and rotatable about the fourth axis of rotation adjacent the second torque plate.

Example 50 includes the apparatus of Example 49, and further includes a third torque plate rotatable about the third axis of rotation adjacent the first sync gear and rotatable about the fourth axis of rotation adjacent the second sync gear.

Example 51 includes the apparatus of Example 44, and further includes a first sync gear rotatable about the first axis of rotation with the first gear and rotatable about the third axis with the link gear.

Example 52 includes the apparatus of Example 51, and further includes a second sync gear rotatable about the second axis of rotation with the second gear and rotatable about the fourth axis of rotation with the link gear.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A device comprising: a first screen having a first end and a second end; a second screen having a third end and a fourth end; a first hinge pair; a second hinge pair, the first hinge pair and the second hinge pair to enable 360 degrees of rotation between the first screen and the second screen, the first screen positionable relative to the second screen such that the first end and the third end are separated a first distance and the second end and the fourth end are separated a second distance when the device is in a closed position, the second distance less than the first distance, the first distance corresponding to a gap between the first and third ends; and a physical keyboard dimensioned to be stowed in the gap, and the physical keyboard couplable in a plurality of positions on at least a portion of at least one of the first screen or the second screen.

2. The device of claim 1, wherein the keyboard is magnetically couplable over at least a portion of at least one of the first screen or the second screen.

3. The device of claim 1, wherein the keyboard is removably couplable to at least one of the first screen or the second screen.

4. The device of claim 1, further including a keyboard detector to detect a position of the keyboard relative to the first screen or second screen.

5. The device of claim 1, further including a display selector to select a user interface to display based on the position of the keyboard.

6. The device of claim 1, wherein the first hinge pair includes a first gear and a link gear.

7. The device of claim 6, wherein the first gear is rotatable relative to the link gear.

8. The device of claim 6, wherein the first hinge pair includes a second gear.

9. The device of claim 8, wherein the second gear is rotatably coupled to the link gear.

10. The device of claim 8, wherein the first gear engages a first end of the link gear and the second gear engages a second end of the link gear, the second end opposite the first end.

11. The device of claim 8, wherein the first gear includes a first extension within a first chassis of the first screen and the second gear includes a second extension within a second chassis of the second screen.

12. The device of claim 1, further including:
a first torque plate; and
a second torque plate, at least one of the first torque plate or the second torque plate between the first screen and the second screen.

13. A device comprising:
a first screen having a first end and a second end;
a second screen having a third end and a fourth end;
means for rotatably coupling the first screen and the second screen to enable at least one of the first screen or the second screen to move between an open position and a closed position, the first end and the third end are separated a first distance when in the closed position, and the second end and the fourth end are separated a second distance when in the closed position, the second distance less than the first distance, the first end and the third end defining a gap therebetween when the first and second screens are in the closed position; and
a physical keyboard stowable in the gap.

14. The device of claim 13, wherein the device has a wedge-shaped profile when the first and second screens are in the closed position.

15. The device of claim 13, further including means for coupling the keyboard above at least one of the first screen or the second screen.

16. The device of claim 15, wherein the means for coupling the keyboard removably couples the keyboard to at least one of the first screen or the second screen.

17. The device of claim 15, wherein the means for coupling the keyboard enables the keyboard to be coupled in any of a plurality of positions above the at least one of the first screen or the second screen.

18. The device of claim 17, further including means for detecting a position of the keyboard relative to the first screen or second screen.

19. The device of claim 18, further including means for selecting a user interface to display based on the position of the keyboard.

20. The device of claim 18, further including:
means for detecting whether the first and second screens are in the open position or the closed position; and
means for outputting a notice if at least one of the first or the second screens is moved to the closed position without the detecting means detecting a presence of the keyboard above at least one of the first screen or the second screen.

21. The device of claim 13, wherein the means for rotatably coupling enables 360 degrees of rotation between the first screen and the second screen.

* * * * *